(12) United States Patent
Story et al.

(10) Patent No.: US 8,635,129 B2
(45) Date of Patent: Jan. 21, 2014

(54) CUSTOMIZED CONTENT DELIVERY

(75) Inventors: Guy Story, New York, NY (US); Howard Wolfish, Berkeley Heights, NJ (US); Bryan Field-Elliot, Santa Barbara, CA (US); Glenn Rogers, Montclair, NJ (US); Alexander Galkin, East Brunswick, NJ (US); Igor Grebnev, Redmond, WA (US); John Federico, Maplewood, NJ (US); Steven Hatch, West Orange, NJ (US); Deepa Muralikrishnan, Clifton, NJ (US); Arik Meyer, Cologne (DE)

(73) Assignee: Audible, Inc., Newark, NJ (US)

( * ) Notice: Subject to any disclaimer, the term of this patent is extended or adjusted under 35 U.S.C. 154(b) by 0 days.

(21) Appl. No.: 13/556,037

(22) Filed: Jul. 23, 2012

(65) Prior Publication Data

US 2012/0290456 A1 Nov. 15, 2012

Related U.S. Application Data

(62) Division of application No. 11/904,720, filed on Sep. 28, 2007, now Pat. No. 8,230,037.

(60) Provisional application No. 60/848,166, filed on Sep. 29, 2006.

(51) Int. Cl.
*G06Q 20/00* (2012.01)
*G06Q 30/00* (2012.01)
*G07F 19/00* (2006.01)
*H04M 15/00* (2006.01)

(52) U.S. Cl.
USPC .................................. 705/34; 705/20; 705/26

(58) Field of Classification Search
USPC ............................................................ 705/34
See application file for complete search history.

(56) References Cited

U.S. PATENT DOCUMENTS

| | | | |
|---|---|---|---|
| 5,666,578 A * | 9/1997 | Oikawa et al. | 396/319 |
| 5,790,423 A | 8/1998 | Lau | |
| 5,825,883 A * | 10/1998 | Archibald et al. | 705/53 |
| 5,872,712 A | 2/1999 | Brenneman | |
| 5,926,624 A | 7/1999 | Katz | |

(Continued)

FOREIGN PATENT DOCUMENTS

| WO | WO 01/76238 A2 | 10/2001 |
|---|---|---|
| WO | WO 03/051043 A1 | 6/2003 |

(Continued)

OTHER PUBLICATIONS

Summer of greed, McLease, Don Austin, American Statesman May 26, 1994.*

(Continued)

*Primary Examiner* — Matthew Gart
*Assistant Examiner* — Harshad Parikh
(74) *Attorney, Agent, or Firm* — Knobbe, Martens, Olson & Bear, LLP

(57) ABSTRACT

Systems and methods are provided for delivering content to a consumer and tracking the content consumed. For example, electronic content may be provided to a playback device of a consumer. An indication of the amount of content actually consumed by the consumer may be received, where the amount is determined by tracking the content consumed. A cost of content may be calculated based on the indication of the amount of content consumed.

17 Claims, 12 Drawing Sheets

(56) References Cited

U.S. PATENT DOCUMENTS

| | | | |
|---|---|---|---|
| 6,158,005 A | 12/2000 | Bharathan | |
| 6,170,060 B1 | 1/2001 | Mott | |
| 6,253,237 B1 | 6/2001 | Story | |
| 6,480,961 B2 | 11/2002 | Rajasekharan | |
| 6,553,455 B1* | 4/2003 | Asano et al. | 711/111 |
| 6,560,651 B2 | 5/2003 | Mott et al. | |
| 6,810,409 B1 | 10/2004 | Fry et al. | |
| 7,028,071 B1 | 4/2006 | Slik | |
| 7,065,505 B2* | 6/2006 | Stefik et al. | 705/54 |
| 7,139,736 B2* | 11/2006 | Stefik et al. | 705/51 |
| 7,310,810 B1* | 12/2007 | Hamada et al. | 725/91 |
| 7,356,144 B2* | 4/2008 | Nishimoto et al. | 380/210 |
| 7,693,914 B2* | 4/2010 | Oren et al. | 707/795 |
| 7,827,110 B1* | 11/2010 | Wieder | 705/52 |
| 7,930,721 B1* | 4/2011 | Hernes | 725/78 |
| 7,963,437 B1* | 6/2011 | McBride et al. | 235/101 |
| 8,230,037 B2* | 7/2012 | Story et al. | 709/217 |
| 8,387,084 B1* | 2/2013 | Klappert et al. | 725/25 |
| RE44,053 E* | 3/2013 | Chang et al. | 714/784 |
| 2002/0049604 A1* | 4/2002 | Gustman | 705/1 |
| 2002/0082881 A1* | 6/2002 | Price et al. | 705/7 |
| 2002/0091641 A1* | 7/2002 | Offer | 705/52 |
| 2002/0095387 A1* | 7/2002 | Sosa et al. | 705/65 |
| 2002/0111154 A1 | 8/2002 | Eldering et al. | |
| 2002/0143565 A1* | 10/2002 | Headings et al. | 705/1 |
| 2003/0040962 A1* | 2/2003 | Lewis | 705/14 |
| 2003/0110132 A1* | 6/2003 | Sako | 705/51 |
| 2003/0131252 A1* | 7/2003 | Barton | 713/193 |
| 2003/0167202 A1* | 9/2003 | Marks et al. | 705/14 |
| 2003/0171985 A1* | 9/2003 | Prabhu et al. | 705/14 |
| 2003/0172012 A1* | 9/2003 | Otsuka et al. | 705/32 |
| 2003/0188316 A1* | 10/2003 | DePrez | 725/87 |
| 2004/0024688 A1* | 2/2004 | Bi et al. | 705/37 |
| 2004/0030620 A1* | 2/2004 | Benjamin et al. | 705/32 |
| 2004/0122767 A1* | 6/2004 | Sanchez | 705/40 |
| 2004/0123323 A1* | 6/2004 | Russo | 725/31 |
| 2004/0123324 A1* | 6/2004 | Sazzad et al. | 725/89 |
| 2004/0260767 A1 | 12/2004 | Kedem et al. | |
| 2005/0038753 A1* | 2/2005 | Yen et al. | 705/59 |
| 2005/0086172 A1* | 4/2005 | Stefik | 705/51 |
| 2005/0091681 A1* | 4/2005 | Borden et al. | 725/31 |
| 2005/0111663 A1* | 5/2005 | Lotspiech et al. | 380/239 |
| 2005/0130585 A1* | 6/2005 | Gnuschke et al. | 455/3.06 |
| 2005/0144020 A1* | 6/2005 | Muzaffar et al. | 705/1 |
| 2005/0144141 A1* | 6/2005 | Nagao | 705/59 |
| 2005/0163062 A1* | 7/2005 | Salesky et al. | 370/260 |
| 2005/0170894 A1* | 8/2005 | Okamoto | 463/42 |
| 2005/0172007 A1 | 8/2005 | Avrahami et al. | |
| 2005/0198269 A1 | 9/2005 | Champagne et al. | |
| 2005/0210498 A1* | 9/2005 | Scott et al. | 725/8 |
| 2005/0265386 A1* | 12/2005 | Smith et al. | 370/466 |
| 2005/0289068 A1* | 12/2005 | Stefik et al. | 705/51 |
| 2005/0289636 A1* | 12/2005 | Schiller | 725/135 |
| 2006/0008069 A1* | 1/2006 | Deo et al. | 379/221.06 |
| 2006/0059011 A1* | 3/2006 | Ulreich et al. | 705/1 |
| 2006/0085812 A1* | 4/2006 | Shishegar et al. | 725/19 |
| 2006/0140169 A1* | 6/2006 | Soundararajan | 370/352 |
| 2006/0143084 A1* | 6/2006 | Donnelli et al. | 705/14 |
| 2006/0167860 A1 | 7/2006 | Eliashberg et al. | |
| 2006/0190404 A1* | 8/2006 | Stefik et al. | 705/51 |
| 2006/0242020 A1* | 10/2006 | Walker et al. | 705/14 |
| 2006/0265285 A1* | 11/2006 | Hamasaki et al. | 705/16 |
| 2006/0271484 A1* | 11/2006 | Stefik et al. | 705/51 |
| 2007/0031110 A1* | 2/2007 | Rijckaert | 386/68 |
| 2007/0033652 A1* | 2/2007 | Sherwani et al. | 726/26 |
| 2007/0133795 A1* | 6/2007 | Kahn et al. | 380/201 |
| 2007/0157228 A1* | 7/2007 | Bayer et al. | 725/34 |
| 2007/0186266 A1* | 8/2007 | Watson et al. | 725/134 |
| 2007/0219910 A1 | 9/2007 | Martinez | |
| 2007/0234391 A1* | 10/2007 | Hunter et al. | 725/87 |
| 2007/0250781 A1* | 10/2007 | Dolph | 715/745 |
| 2007/0260690 A1* | 11/2007 | Coleman | 709/205 |
| 2007/0299933 A1 | 12/2007 | Moon | |
| 2007/0299978 A1 | 12/2007 | Neumann et al. | |
| 2008/0091796 A1* | 4/2008 | Story et al. | 709/217 |
| 2008/0216107 A1* | 9/2008 | Downey et al. | 725/22 |
| 2009/0031335 A1* | 1/2009 | Hendricks et al. | 725/1 |
| 2012/0290456 A1* | 11/2012 | Story et al. | 705/34 |

FOREIGN PATENT DOCUMENTS

| | | | |
|---|---|---|---|
| WO | WO 2005/089336 A2 | | 9/2005 |
| WO | WO 2005/089336 A3 | | 9/2005 |
| WO | WO 2005/112334 A2 | | 11/2005 |
| WO | WO 2005/112334 A3 | | 11/2005 |

OTHER PUBLICATIONS

Predictors of advertising, Speck Paul;Journal of avertising 26.3 (Fall 1997) pp. 61-76.*

Chesnais, Pascal et al. "The Fishwrap Personalized News System," Jun. 20, 1995, pp. 275-282.

"What is iPodderX?" http://web.archive .org/web/20041031000450/ http://ipodderx.com/, Oct. 31, 2004, pp. 1-2.

International Search Report of International Application No. PCT/US2007/020904, Jun. 3, 2008, 6 pages.

PCT International Preliminary Report on Patentability dated Apr. 9, 2009, for related international application serial No. PCT/US2007/020904.

* cited by examiner

300

```
<?xml version="xx"?>
<rss version="xx">
<channel>
<title>      TITLE OF SYNDICATION FEED      </title>             305
<link> http://URL OF SYNDICATION FEED PAGE </link>               310
<description> DESCRIPTION OF SYNDICATION FEED </description>     315
<language> LANGUAGE  </language>                                 320
<copyright> COPYRIGHT NOTICE  </copyright>                       325
<item>                                                           330
<title> TITLE OF EPISODE </title>                                335
<link> http://URL OF EPISODE LISTING </link>                     340
<description> DESCRIPTION OF EPISODE </description>
<enclosure url="http://URL OF CUSTOMIZED CONTENT FILE "          345
    length=" LENGTH OF CONTENT" type="TYPE OF CONTENT" />
</item>
</channel>
</rss>
```

```
<?xml version="xx"?>
<rss version="xx">
<channel>
<title>    TITLE OF SYNDICATION FEED    </title>        ← 305
                                                        ← 310
<link> http://URL OF SYNDICATION FEED PAGE </link>      ← 315
<description> DESCRIPTION OF SYNDICATION FEED </description>
                                                        ← 320
<language> LANGUAGE </language>
                    ← 325
<copyright> COPYRIGHT NOTICE </copyright>
<item>              ← 332
<title> TITLE OF UNIQUE EPISODE </title>    ← 337
<link> http://URL OF UNIQUE EPISODE LISTING </link>     ← 342
<description> DESCRIPTION OF UNIQUE EPISODE </description>
                                                        ← 347
<enclosure url="http://URL_OF_UNIQUE_CONTENT_FILE_"
      length=" LENGTH OF CONTENT" type="TYPE OF CONTENT" />
</item>
</channel>
</rss>
```

```
<?xml version="xx"?>
<rss version="xx">
<channel>
<title>    TITLE OF SYNDICATION FEED    </title>
<link> http://URL OF SYNDICATION FEED PAGE </link>
<description> DESCRIPTION OF SYNDICATION FEED </description>
<language> LANGUAGE </language>
<copyright> COPYRIGHT NOTICE </copyright>

<item>
<title> TITLE OF EPISODE PART I </title>
<link> http://URL OF EPISODE PART I LISTING </link>
<description> DESCRIPTION OF EPISODE PART I </description>
<enclosure url="http://URL OF CUSTOMIZED CONTENT FILE "
          length=" LENGTH OF CONTENT" type="TYPE OF CONTENT" />
</item>

<item>
<title> TITLE OF EPISODE PART II </title>
<link> http://URL OF EPISODE PART II LISTING </link>
<description> DESCRIPTION OF EPISODE PART II </description>
<enclosure url="http://URL OF CUSTOMIZED CONTENT FILE PART II "
          length=" LENGTH OF CONTENT" type="TYPE OF CONTENT" />
</item>

</channel>
</rss>
```

Labels: 405, 410, 415, 420, 425, 430, 435, 440, 445, 455, 460, 465, 470

FIG. 4a

```
<?xml version="xx"?>
<rss version="xx">
<channel>
<title>      TITLE OF SYNDICATION FEED      </title>   405
<link> http://URL OF SYNDICATION FEED PAGE  </link>   410
<description> DESCRIPTION OF SYNDICATION FEED  </description>   415
<language> LANGUAGE  </language>   420
<copyright> COPYRIGHT NOTICE  </copyright>   425
<item>   432
<title> TITLE OF UNIQUE EPISODE PART I </title>   437
<link> http://URL OF UNIQUE EPISODE PART I LISTING </link>   442
<description> DESCRIPTION OF UNIQUE EPISODE PART I </description>   447
<enclosure url="http://URL OF UNIQUE CONTENT FILE "
         length=" LENGTH OF CONTENT" type="TYPE OF CONTENT" />
</item>
<item>   457
<title> TITLE OF UNIQUE EPISODE PART II </title>   462
<link> http://URL OF UNIQUE EPISODE PART II LISTING </link>   467
<description> DESCRIPTION OF UNIQUE EPISODE PART II </description>
<enclosure url="http://URL OF UNIQUE CONTENT FILE PART II "
         length=" LENGTH OF CONTENT" type="TYPE OF CONTENT" />   472
</item>

</channel>
</rss>
```

FIG. 4b

CUSTOMIZED CONTENT DELIVERY

PRIORITY CLAIM

This application is a divisional of U.S. patent application Ser. No. 11/904,720, filed Sep. 28, 2007 now U.S. Pat. No. 8,230,037 and entitled "Methods and Apparatus for Customized Content Delivery," which claims priority to U.S. Provisional Application Ser. No. 60/848,166, filed Sep. 29, 2006, entitled "Methods and Apparatus For Targeted Content Delivery." The entirety of U.S. patent application Ser. No. 11/904,720 is hereby incorporated by reference herein.

FIELD OF INVENTION

The present invention generally relates to the delivery of electronic content, more specifically, to the targeted delivery of electronic content over a network.

BACKGROUND

The proliferation and considerable growth of the Internet and World Wide Web have opened new avenues of content delivery to consumers. Information delivery applications, such as web browsers, have advanced through the years with increasing capabilities and opportunities to transmit and share electronic data. First generation web browsers displayed simple hypertext linked to another file containing additional text. Over time, these browsers have been replaced by more sophisticated, dynamic applications that enable content providers and users alike to interact with each other over a network through the implementation of text, graphics, audio, video and many combinations thereof.

One of the greatest advancements of the Internet and computer networks has revolved around development of encoded audio and video files, such as MP3s. Audio and video content may now be digitally encoded into files and transmitted across one or more networks. Such digital encoding and compression techniques allow a great amount of content to be packaged into a single file, thereby making content more portable.

Spoken-word content has become an increasingly popular means of entertainment. Users may browse and purchase audio-based content over the Internet to download to a portable device. For example, an audiobook or other spoken word audio content may be purchased through an online website and downloaded to a computer or portable media device. A user may then listen to the content subject to any restrictions imposed by the content provider, such as time, re-playing or other restrictions.

Portable media devices such as MP3 players and Apple's iPod® have permeated modern society for use, not only for entertainment purposes, but also for many business applications. These devices are no longer limited to simply playing a user's encoded music files, but instead have become an invaluable means by which regularly updated information, such as electronic news feeds or other updatable content, are provided to and consumed by an end user.

One emerging technology which provides access to electronic content is the distribution of multimedia files through content feeds using the Really Simple Syndication ("RSS") standard. Content providers may publish a web feed on a hosting site or application. A user wishing to "subscribe" to the content can register or activate a reader, such as a special-purpose application or browser, which will present the user with updated or new content.

Content providers periodically update the information or materials posted on a server or website, and the reader will update what is presented to the user via links to the information. Examples of web sites or readers include personalized web pages from Google® or Yahoo! Inc.'s My Yahoo!. When a user subscribes to a particular feed, the reader will poll the server on which the content is stored, looking for updates. If an update is located, the reader will post, or update, the page presented to the user.

The field of content feeds with downloadable content, sometimes referred to as "podcasts," has become a popular method of sharing and transmitting updated media to a variety of users through RSS feeds. A creator of a podcast, which is generally a downloadable audio or video file, such as an MP3 or MP4 file, simply records and encodes his or her content and posts the podcast to a server or other site which may post the podcast for its users to download. A content provider provides a content feed which users can subscribe to using client applications, such as Apple's iTunes®. A user may download and then transfer those podcasts to a portable media device in order to listen to or watch the podcast at a later time, away from the computer.

Traditional podcasting involves a user's subscribing to a feed by registering the Uniform Resource Locator ("URL") of the feed with a client application, or podcatcher software. The user's personal computer (or other computing device) connects over a network to retrieve the feed URL from the content provider's server through the podcatcher software. The server then returns an RSS-compliant extensible markup language ("XML") package to the computing device. The computing device extracts an enclosure URL, which has the location of the content, from the XML package. The computing device then retrieves the content file located at the enclosure URL. The computing device then imports, or stores, the content file either on its own storage media, or at another designated location such as a portable media device or player. Typically the podcatcher software periodically polls the server to download updated RSS feeds, whereby the process is then repeated at some interval.

The content provider may require users to register each device in order to facilitate delivery of content. The device, usually a computing device or mobile device player, is registered through a connection to the content provider's servers in which some identifying aspect of the device is stored by the content provider. These identifiers may include hardware serial numbers, device names, device types, etc. Requiring the registration of a device may allow the content provider to maintain control over the content it distributes, such as by preventing unauthorized playback if a device is not registered.

Current methods for subscribing to a podcast, however, are inefficient. A user must register the URL of each feed separately at each destination device or system. For instance, if a user desires to have a particular feed sent to his or her portable media player, home computer and work computer, then the process of registering the feed with a client application must be repeated for each device. This is inconvenient and inefficient for the user.

SUMMARY

Methods and apparatus for customized targeted content delivery via content feeds are provided. Embodiments of the present invention include methods of delivering targeted and individualized electronic content over a network. The content delivered through certain content feeds may be specifically tailored to a specific user based on numerous criteria including, but not limited to, attributes of the user (such as gender, age, income, location), usage characteristics, subject matter of previous downloads, subscription details, and targeted advertising. In one embodiment, the content provider is able to track and monitor the download characteristics of individual users and adapt the content delivered in the feeds.

In one embodiment, a method of delivering targeted electronic content over a network includes providing a subscription to a content feed to a user. The location of the feed includes an identifier associated with the user. A content provider's server may use this identifier to locate and create a customized content feed. A request for the content feed location is received and XML data stored at the feed location may be transmitted to a client computing device. An enclosure URL may then be extracted from the XML package. The enclosure URL contains an identifier associated with the user or with a group of users and indicates the location of a content file. The identifier associates the user to the customized content file such that the customized content file contains the targeted electronic content. The customized content file is then transmitted to the user. In another embodiment, the content file may not contain customized content, however the identifier included in the feed URL is utilized to track and monitor the download characteristics of individual users.

A system for delivering a customized content file to a playback device, the system including a remote computer which allows a user to register with a content provider and which creates a customized content feed based on information received from user registration, the customized content feed including one or more customized content files, wherein the customized content file is described by a customized content file specification; wherein the remote computer allows the user to subscribe to the customized content feed and transmits a data package including a network location of the customized content feed to the playback device such that the network location of the customized content feed may be extracted from the data package; and wherein when the playback device requests content from the customized content feed, the content provider provides the customized content file specification to the playback device, and a directory computer transmits locations of peer computing devices to the playback device that have logical components specified in the customized content file specification, such that the customized content file is created from logical components provided by the peer computing devices.

Other aspects of the invention are directed toward systems and methods for billing a content consumer based on content consumption, the system including a remote computer that provides electronic content to a consumer, wherein the remote computer is configured to track an amount of content actually consumed by the content consumer based on an indication of the consumed content provided to the remote computer, and calculate a cost of content based on the indication of the consumed content.

Another aspect of the present invention is directed toward systems and methods of creating a sample of an electronic content file for transmission to others, the method including allowing a user to receive one or more electronic content feeds, providing a playback device with an electronic content file from the one or more electronic content feeds, allowing the user to select a portion of the electronic content file for transmission to others, copying the selected portion of the electronic content file to an excerpt file, and transmitting the excerpt file to another.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3a is a sample XML source file of a content feed in accordance with an embodiment of the present invention;

FIG. 3b is a sample XML source file of a content feed in accordance with an embodiment of the present invention; and FIG. 4a is another sample XML source file of a content feed in accordance with an embodiment of the present invention; and FIG. 4b is another sample XML source file of a content feed in accordance with an embodiment of the present invention;

DETAILED DESCRIPTION

Detailed embodiments of the present invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the present invention in virtually any appropriately detailed embodiment.

Figure 1:
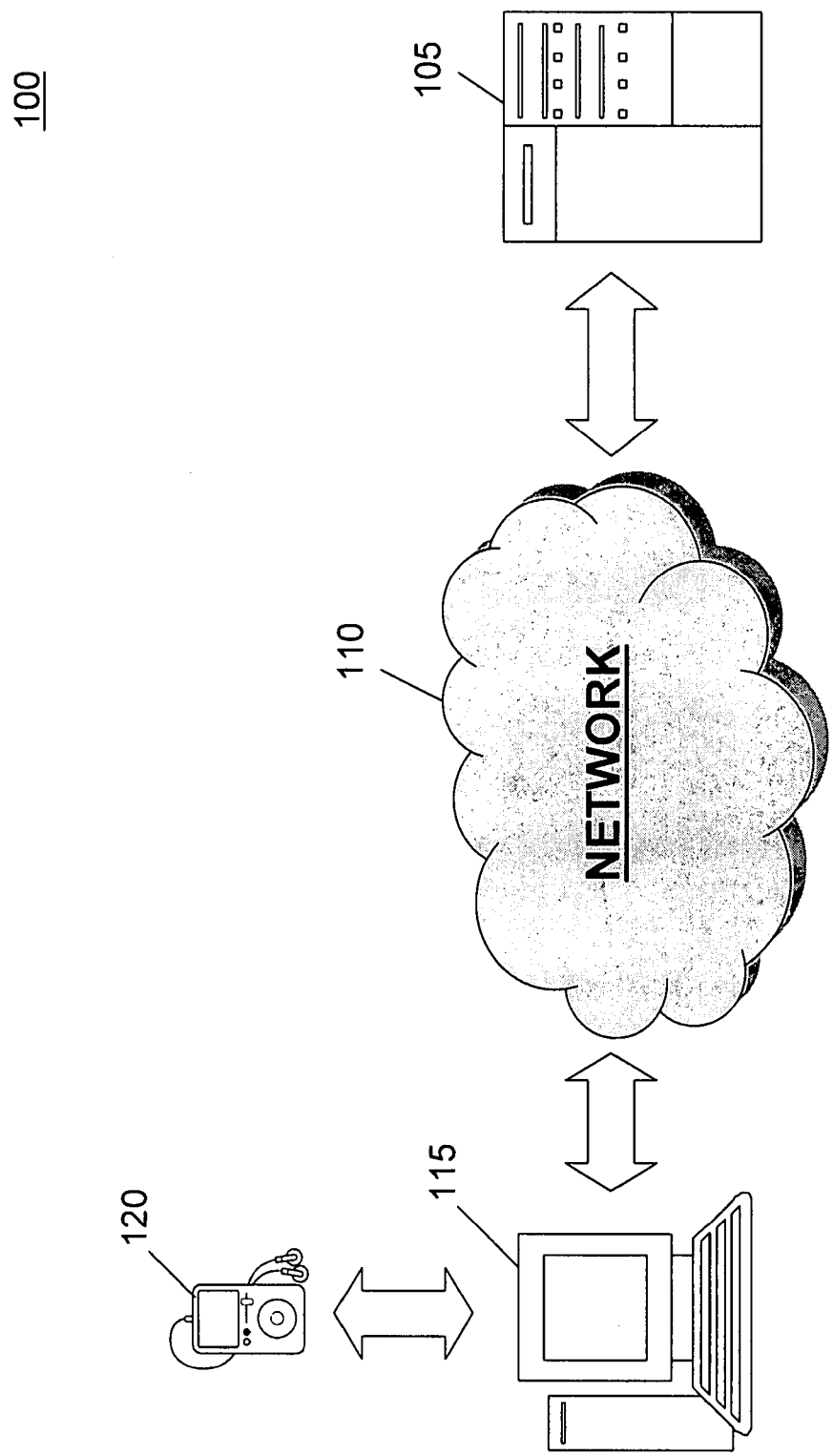
FIG. 1 is a diagram of a computer network in accordance with an embodiment of the present invention.

An embodiment of a computer network constructed in accordance with the principles of the present invention is depicted in FIG. 1. In this illustrative embodiment, a computing device 115 (such as a personal computer or other suitable computing device) communicates across network 110 with a server 105. This may be accomplished using known communication protocols such Hyper Text Transfer Protocol, Ethernet, streaming technologies, etc. Network 100 may be any suitable local area network (LAN), wide area network (WAN), the Internet or any suitable combination thereof. As shown, a portable media device 120 such as a PDA, cell phone, MP3 player or the like may be linked electronically to computing device 115 (e.g., through a hardwired connection such as a USB or Firewire link or wirelessly through a WiFi or cellular link). Devices which require a host such as computing device 115 to access information are referred to as "passive devices." Alternatively, in some embodiments, portable media device 120 is capable of communicating substantially directly with server 105, via either wired or wireless network connection. A device 120 having such a capability may be referred to as an "active device." Moreover, it will be understood that any target device described herein such as computing device 115 and portable device 120 having a playback capability may be referred to herein as a "playback device."

In operation, computing device 115 may include one or more interface applications provided by a content service or third party software vendor that manages and/or coordinates the downloading, transmitting, and storage of electronic content delivered by server 105 (not shown). In certain embodiments, in which portable media device 120 connects directly to server 105, the interface application may reside on the device itself. In other embodiments, such an interface application may reside on server 105 and be distributed as required to a portable device 120 (e.g., when the content is source specific or in a distributed application environment).

A user may initiate subscriptions to a variety of content sites through the interface application. Typically, a user will browse the available offerings of the service in search of specific content in which the user is interested. This may involve searching the Internet or other electronic networks or databases. Once the user identifies and selects certain content, a content request is initiated (such as a subscription). Once the user complies with any request requirements (e.g., identification verification, age verification, fee payment, etc.), the interface application connects to server 105 to download the desired content in the form of an electronic file. As described further herein, the interface application may periodically poll server 105 through the network 110 looking for updated or new content to which the user has subscribed or requested. In other embodiments, updated or new content may be transmitted to device 120 as it becomes available or at predefined intervals. For example, such content (or links to updated content) may be sent to the user using a "push" technology over a wireless network subject to memory limitations in device 120.

When new or updated content is available, the user may view or listen to the content with computing device 115 (e.g., through Windows Media Player) and/or may transfer the content to portable device 120, such as Apple, Inc.'s iPod® or to any suitable other digital media player (generally depicted as device 120 in FIG. 1). The user may then view or listen to the electronic content at his or her convenience. For example, if a user has subscribed to a spoken-word news feed which updates daily, the application may download the morning's current news and headlines content file to the computing device 115. If the user wishes to listen to the news content while commuting to work or exercising, the user simply synchronizes player 120 (through a wired or wireless communication path), thereby transferring or copying the content file from computing device 115 to the portable media player 120. The next day, the user may repeat the process with a new and updated news feed published by the content provider. Alternatively, such content may be transmitted substantially directly to devices 120 as it becomes available as described above (assuming device 120 is an active device).

Figure 2:
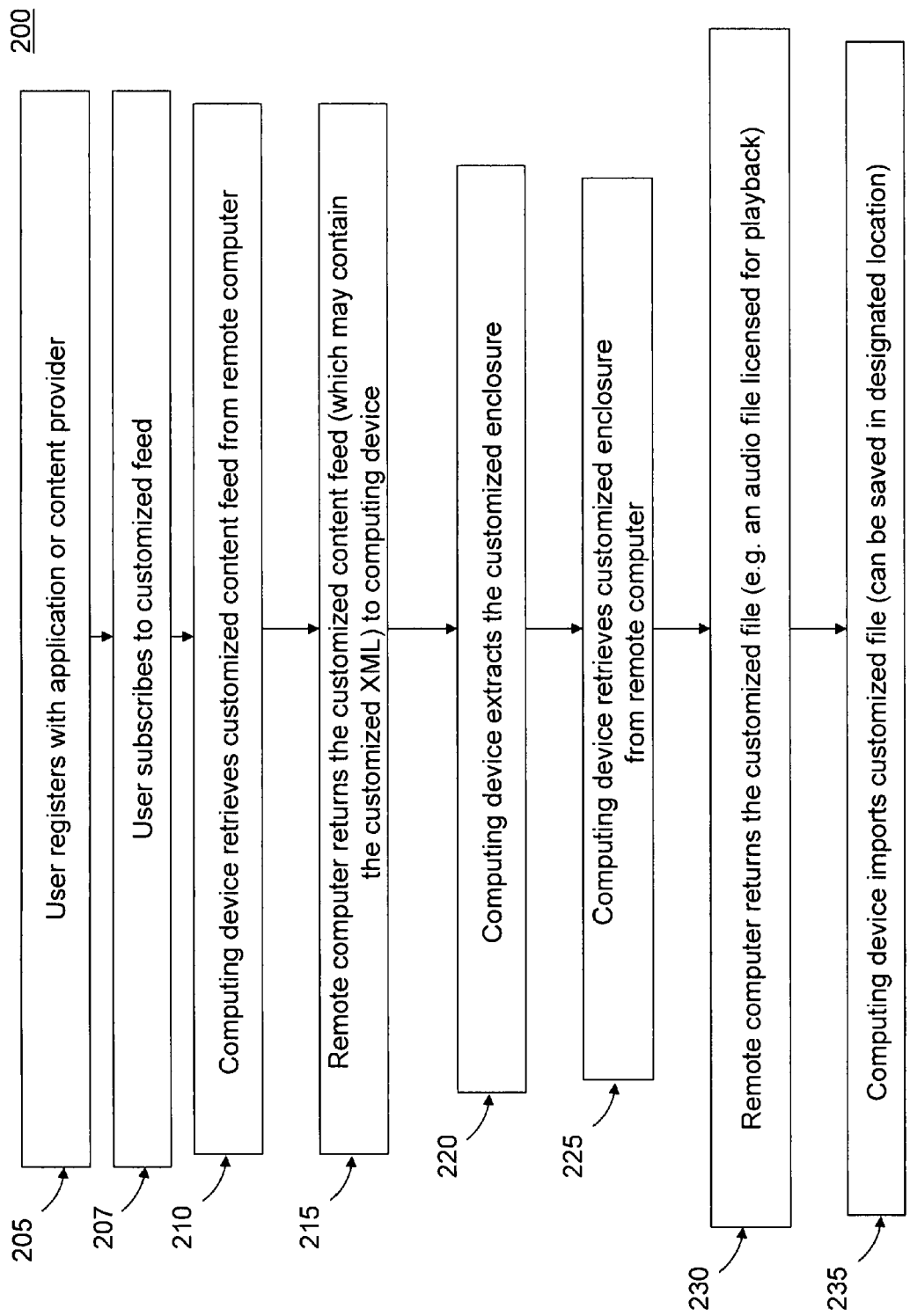
FIG. 2 is a flow chart depicting targeted content delivery in accordance with an embodiment of the present invention.

Turning now to FIG. 2, a flow chart 200 is shown which depicts some of the steps involved in delivering targeted content according to an embodiment of the present invention. For example, an embodiment of the present invention may provide user-specific, or targeted, content based on various criteria associated with an end user. Based on this information, the content provider is able to tailor the content delivered to each individual user by creating a customized feed URL or other distribution path for delivery to the user.

For example, a user may subscribe to a certain feed offered by a content provider using a client application (step 205). This application, which, in some embodiments, may be a "podcatcher" application, may present the user with a listing of feeds, or "podcasts," available for subscription from one or more content providers. At step 205, the user may identify himself to the client application, which may in turn identify the user to one or more content providers (or provide such information substantially directly to the content providers). Identification may include a registration process through which the user provides certain information such as name, address, age, gender, preferences, the type of download platform, etc. In response to this information, one or more content providers may customize content feeds to which the user may subscribe. The feeds may include any category of content, such as, without limitation, news, business, technology, mystery, music, etc. Additionally, some embodiments of the present invention may include various media formats for the feeds, such as images, audio, video, text, etc. Customization may also take into account the capabilities of any identified platform and select customized content accordingly (e.g., provide WAP content for basic wireless devices, only provide video for devices with video playback capability, etc.). At step 207, the user may browse various customized feeds and select from among them.

Part of the subscription process may allow the user to set up an iterative request to one or more of the selected content feeds which will be individually customized for that user by the content provider. The user may subscribe to the customized feed or set up the iterative request through the interface of the client application (on either computing device 115 or and active version of portable device 120). This information is communicated across network 110 to the content provider's server and requests a customized feed URL from the server (step 210). The content provider's server, which is generally represented as server 105, may return a customized feed, such as a RSS feed, to computing device 115 or active device 120 (step 215). The customized feed may contain a customized XML package that contains identifying information about the user.

In one embodiment, when the computing device 115 or device 120 receives the customized feed, the application extracts a customized enclosure URL from the XML (step 220). The customized enclosure URL may detail the network location of the user-specific content file. In some embodiments, the enclosure URL points to a server application that is invoked to deliver a file according to certain policies that may customize the content to be delivered, such as by inserting a targeted advertisement. In certain embodiments, the enclosure URL may point to a separate component enabling the requested information to be provided from a server having or most recently handled the requested information (e.g., a peer to peer architecture (discussed in more detail below)).

The application may then request the enclosure URL from server 105 (step 225). Next, the remote computer may transmit the customized content file to a playback device such as computing device 115 and/or portable device 120 (step 230). At this point, the customized content file is, imported via the application (step 235). The application interface will present the user with the content file. The user may save the content file to the memory of computing device 115 or portable device 120.

The user may have a set of preferences stored in the application that will control and manage the content files downloaded from server 105. For example, a user may invoke a setting in which the application polls and downloads any new or updated content files and automatically stores the content files in a user-defined directory on devices 115 and/or 120. This may include a set preference to have the content files automatically transferred, or synchronized, to portable device 120 immediately upon connection (through computing device 115 for passive versions of device 120).

Some embodiments of the invention may use an HTTP protocol known in the art to send and receive data across network 110. The data, however, contains customized, user-specific data or content for each individual subscriber. In one embodiment of the present invention, every user who subscribes to a feed has a customized URL for the network location of the content to be delivered. For instance, if two users were to subscribe to feeds for the same content, the URLs obtained by each user's application may be distinct. This may be accomplished, for example, by using an identifier, such as the subscriber's name stored in the URL, making the customized aspect of the feed apparent. In alternative embodiments, the content provider may store the customized content files through a system whereby each subscriber is assigned a number or username, which may be associated with the content files. Such a system preserves anonymity and privacy among the subscribers. When the content provider delivers the content files through server 105, it will locate the content file specific to that user's assigned number or username and transmit that particular file across the network to the user's device.

The ability to provide user-specific content files in content feeds presents the content providers, as well as the subscribers, with numerous benefits. For example, the content providers may monitor from the backend content distribution patterns and preferences of distinct users or group of users. For example, by providing customized content feeds or customized content files, content providers are able to track and control the number of distinct subscribers. The ability to identify the number of downloads by a specific user allows the content provider to reallocate valuable network resources to other subscribers. For instance, identifying a single subscriber who has repeatedly downloaded the same feed may allow the content provider to conserve the bandwidth of its network by limiting the number of permissible downloads over a given time period, thereby eliminating or minimizing abusive downloading practices.

Moreover, the content provider may be able to predict the level of future content requests based on previous request characteristics and statistics. For example, if a content provider is posting a popular news item such as a summary of a sporting event or posting a new audio book such as Harry Potter, the content provider may, based on information obtained from past similar experiences, allocate the resources necessary to satisfy those enhanced requests without undue waiting or system backlog and to prevent severe stress or failover on server 105. Tracking the number of users seeking such information, the frequency of repeated downloads, and the characteristics of those users may facilitate network provisioning and enable the content providers to further customize the content provided.

Additionally, in some embodiments, content providers may collect additional types of user-data that will help further customize the content to an individual user. Examples of user-data that may be obtained include, but are not limited to, gender, age, location, category and genre preferences, type of content (e.g., episode of an audio book, podcast, music download, news or financial market update, etc.), programming length preferences, frequency of updates, consumption habits, device platform and software, and other characteristics of the user and the user's device. Analysis of such data allows the content provider to deliver targeted content to individual users. The customized content files may contain individualized messages, such as targeted advertising and promotional material, or other content based on consumer profiles that may be generated using such information.

Other messages may be related to subscription information such as billing information, personal information verification or update, a summary of services such as amount of information downloaded over a given period of time, subscription expiration warnings or expired subscription notifications. For example, certain content providers may require payment to receive content. The consumer may complete a separate transaction that authorizes the delivery of content for a predetermined period of time or number of episodes. Upon reaching the end of the paid-for period, the user may still access and receive the feed, however the "for-fee" content may be replaced by a message notifying the user of the expiration of the subscription or requesting renewal of the subscription. The identification of the user and any subscription restrictions allows the content provider to customize the content of the feed as it is delivered to the user.

One embodiment of the present invention may include samples based on content of other subscriptions or similar content previously downloaded by that user. For example, if a subscriber had received feeds from a certain author, narrator, publisher, genre, etc., the content provider may include a small sample of other related content by the same author, narrator, publisher, genre, etc. In addition to similar content, the content provider may provide samples of new similar content, current promotional content, or even timely content related to current affairs or news on the subject matter.

An embodiment of the present invention may also allow a user to opt out of certain types of customized content. For example, if a subscriber decides he or she no longer wishes to receive sample content with the regularly downloaded feed, the user may apply a setting in the application program notifying the content provider of his or her preference or change thereof.

In certain embodiments, the content provider may offer distinct content based upon the preferences set by the subscriber. For example, the content provider may allow free or discounted subscriptions to its content feeds provided the subscriber allows the inclusion of advertising material. In such an implementation, the content provider may tailor targeted advertisements to the subscriber based on the subject matter of the content. For example, a subscriber to a sports news feed would be targeted with sports related advertising in exchange for a free subscription. Other examples include basing targeted advertising on geographic location (which may be based on a "home" location or the current location of the user's playback device), promotions or sales currently available from the content provider or sales offered by the content provider's partners. Moreover, the content provider may allow the user to select the type of advertisements or promotional materials he or she would like to receive.

Turning now to FIG. 3a, an example of an XML source file 300 of a content feed, in accordance with an embodiment of the present invention, is shown. The XML source file 300 includes metadata related to the content feed in general as well as to data regarding the customized content (sometimes referred to as an "item"). For example, metadata in the XML file may include the title of the content or feed (field 305), the network location or address of the content page (field 310), a general description of the content (field 315), and the language in which the feed is presented (field 320). The metadata may also include a copyright notice (field 325), the title of the episode, chapter or content section (field 330), the specific location of the episode, chapter or content section (field 335), a general description of the episode, chapter or content section (field 340) and the location of the customized content file, which may be an enclosure URL (field 345).

In some embodiments the title and location of the episode, chapter or content section may be unique. This is shown in FIG. 3b, which is substantially the same as FIG. 3a with the exception of fields 332, 337, 342 and 347, which are unique version of their counterparts, 330, 335, 340 and 345 respectively, in FIG. 3a. This may be desirable, for example, in cases where a content provider provides customized products whose constituent parts are chosen for a particular subscriber. For example, a content provider may offer a subscriber the ability to create his or her own product, by choosing certain selections from other products which may be combined into one product specified by the user (e.g., sports articles from a variety of different subscriptions). The product name and description might then be unique for each subscriber's product based on the subscriber's name, user name, password or network address or combination thereof.

In one embodiment, the enclosure URLs 345 and 347 may include the location of the customized content file, as well as the length of the content and the type of content, i.e., audio, video, text, etc. The fields described above may be updated regularly with new content files, locations, and descriptions, while other parts of the XML source file, outside the item, may be static.

In one embodiment of the present invention, multiple items may be included into a single XML source file. As shown in FIG. 4a, an XML source file 400 may detail the information about the content generally, such as the title (field 405), URL of the content page (field 410), description of the content (field 415), language of the content (field 420), or copyright or other notices (field 425).

As shown, XML source file 400 may also contain multiple items describing distinct content files. In the illustrative example shown in FIG. 4a, a first item contains information regarding the first part of an episode (fields 430, 435, 440, and 445), as well as a second item having information regarding a second part of an episode (fields 455, 460, 465, and 470). Such an embodiment allows the content provider to package the information of multiple content files into a single feed, instead of having multiple feeds and multiple links that would require multiple requests and download operations for each subscriber to obtain desired content. This helps to improve downloading efficiency.

In some embodiments the title and location of the episode, chapter or content section may be unique. This is shown in FIG. 4b, which is substantially the same as FIG. 4a with the exception of fields 432, 437, 442, 447, 457, 462, 467, and 472 which are unique version of their counterparts, 430, 435, 440, 445, 455, 460, 465 and 470 respectively, in FIG. 4a. This may be desirable, for example, in cases where a content provider provides customized products whose constituent parts are chosen for a particular subscriber. For example, a content provider may offer a subscriber the ability to create his or her own product, by choosing certain selections from other products which may be combined into one product specified by the user (e.g., sports articles from a variety of different subscriptions). The product name and description might then be unique for each subscriber's product based on the subscriber's name, user name, password or network address or combination thereof.

The ability to package multiple items in a single XML source file also may allow the content provider to include customized targeted content to individual subscribers. For example, the first item may include the substantive content to which the user has subscribed. The second item may be individualized, targeted content determined by the content provider, such as subscription notices, advertising, related sample content, etc. Having separate content files and enclosure URLs enables the content provider to organize and distribute targeted content efficiently, as the provider does not have to encode the substantive content with the targeted content into one content file for every individual subscriber. The implementation of multiple items in a single feed is substantially invisible to the subscriber as the application seamlessly plays each piece of content on computing device 115 or portable device 120.

In an alternative embodiment, multiple content files may be assembled using dynamic file assembly techniques used by the content providers or based on a request by the subscriber or client application for the syndicated feed. In one embodiment of the present invention, content files may be assembled from a series of blocks. The assembly parts may include zero or more introductory parts, referred to herein as "intros", one or more middle sections, and zero or more conclusion sections, referred to herein as "outros". Each middle section may have one or more sub-sections, sub-sub-sections, etc. Middle sections and any sub-sections may include zero or more section intros, one or more blocks, and zero or more section outros. The blocks may contain advertisements or actual content (i.e., the book audio). The blocks may accommodate any current or new type of content, such as audio, visual, textual, multimedia, etc.

In some embodiments, intro sections and outro sections may be omitted, so only middle sections are provided, or intro and middle sections are provided but outro sections omitted, or middle and outro sections included, but intro sections omitted. This may be done for numerous reasons. One reason includes the case of retransmission where certain portions of the content are not properly received, and the server only retransmits the missing sections (which may include adjacent sections in some embodiments). Another situation includes the case where "jumbo" files are employed that span multiple transmission intervals (e.g., when the full file exceeds a certain threshold such as size, expected transmission time, a user preference, etc.). For example, during one transmission interval, a file containing an intro and several middle sections may be transmitted. During a second transmission session, additional middle sections and outros may be included. The sections may be associated with one another at the client side so that playback occurs in the appropriate order. In other cases, the user may have specified that intros and outros be omitted so only the middle sections are transmitted, etc. An example of the structure of a file may be represented as:

```
I1 (intro 1)
I2 (intro 2)
S1I1 (section 1 intro 1)
S1B1 (section 1 block 1)
S1B2 (section 1 block 2)
S2B1 (section 2 block 1)
S2O1 (section 2 outro 1)
O1 (outro 1)
```

One benefit of this file structure is that it allows the content provider to dynamically assemble a content file based on changing conditions and provides the flexibility to replace any section of the file with another different section (e.g., such as advertisement, promotion, sample of new material, and updated version of that section, etc.) at the time of assembly. For example, as content is updated or modified, a new or updated component may be included in the new assembly of a file. For example, a new edition of an audio book may be provided by updating certain sections to reflect the changes from the older version. Other examples may include news updates, financial events or sports scores.

Moreover, embodiments utilizing this dynamic file assembly allow the content provider to supply each user with a customized content file. This may be accomplished by inserting certain additional segments (e.g., based on the collected information described above) such as targeted advertising or other customized segments into the data file to be transmitted to the consumer. Various criteria may be used to determine what replacement/insertions should used: e.g., user attributes, time of day/week/month, location, running time, and user preferences (willing or unwilling listen to ads, etc.), and platform capability (provide only content that may be played the recipient device or that is platform of software specific, etc.).

Yet another advantage of some embodiments of the present invention is the ability to combine multiple subscriptions into a single content feed. As explained above, multiple items may be packaged into a single feed. Taking the example XML source file 400 of FIG. 4a, the first item in the feed, for example, may describe one of the user's subscription feeds and the second item may describe a second subscription feed. The enclosure URL of the first item may point to the content file of the first subscription, while the enclosure URL of the second item may point to the second subscription. In one embodiment, a user may have subscribed to multiple content feeds provided by the same content provider such as a sports news feed and a business news feed. The two feeds may be combined as different items into a single feed.

In one embodiment of the present invention, the individual user may assign which of his or her subscriptions are included in a single feed. Alternatively, the content provider may examine feeds which are transmitted to the same user or group of users and determine which feeds should be combined into a single user-specific feed. Such consolidations may be performed to increase the efficiency of the data transfer by reducing the use of network bandwidth or the loading on the server. For example, a feed may be consolidated from multiple servers to a single server or multiple physically distant servers may be replaced with servers in closer proximity with one another (and the user's location).

Such feeds may also be consolidated based on content. These types of feeds may include pre-packaged and pre-defined feeds offered as bundles to the user. In yet another embodiment, multiple subscription feeds may be combined, or bundled, based on certain criteria. For example, all sports feeds may be bundled together, all news feeds may be bundled together, and all music feeds may be bundled together. All feeds in a certain language may be bundled together. As with the other embodiments described herein, these bundles may be defined by the user or by the content service. Other examples of criteria that may be used in the bundling of multiple feeds may include, but are not limited to, length, genre, publisher, author, narrator, or content provider (i.e., outside content), type of platform that is compatible, etc.

In one embodiment of the present invention, content feeds may be used to describe non-subscription based content, such as audio books or other one-time purchase content. A content feed may be dedicated to non-subscription content such that each time a book is purchased, it is delivered to the user via this feed. This embodiment provides alternatives to the traditional electronic audio book or "e-book" delivery methods.

While the embodiments described herein detail a customized feed containing targeted content for an identified user, one skilled in the art should recognize that the feed, the content, and the URLs in some embodiments may be entirely unique. In such embodiments, the contents of the XML compliant package may be encrypted to protect the content. The encrypted portions of the feed, by nature of the encryption scheme and key utilized, may be entirely unique. Embodiments of the present invention may be used to deliver confidential, secret or otherwise secure content by making the feed subject to a unique encryption scheme. The secure feed may be delivered over a wide area network or local area network, however only the user having the appropriate encryption key will be able to decipher the feed. In one embodiment a feed containing content or data that needs to be secured is generated using the techniques and methods described above. The feed may then be encrypted using any effective method known in the art, thereby creating a unique feed for a specified and authorized user. Upon authentication of the user's identity an encryption key may be applied to the unique feed to extract the secure content or data. Such systems may be advantageous for the sharing of secure information by governments or corporations, and for various commercial applications involving financial transactions, etc. One skilled in the art should recognize that the embodiments presented herein are not limited to traditional podcasting environments.

Other aspects of the inventions allow for various dynamic pricing models of content, subscriptions or one-time purchase content. For example, a content provider may offer a bundled feed at a reduced price to the subscriber compared to the regular price if the subscriber were to purchase each piece of content described in the feed separately. Fees for content may be reduced or waived if the user agrees to accept a certain level of advertising in the requested content. Because the feeds may be unique to each individual subscriber, purchases and other transactions may be completed over the network and tied to each subscriber's identity. Alternative embodiments also allow for user-defined bundles at a reduced fee. For example, the subscription fees per feed may be reduced upon the purchase and bundling of additional feeds also offered by the content provider.

Figure 5:
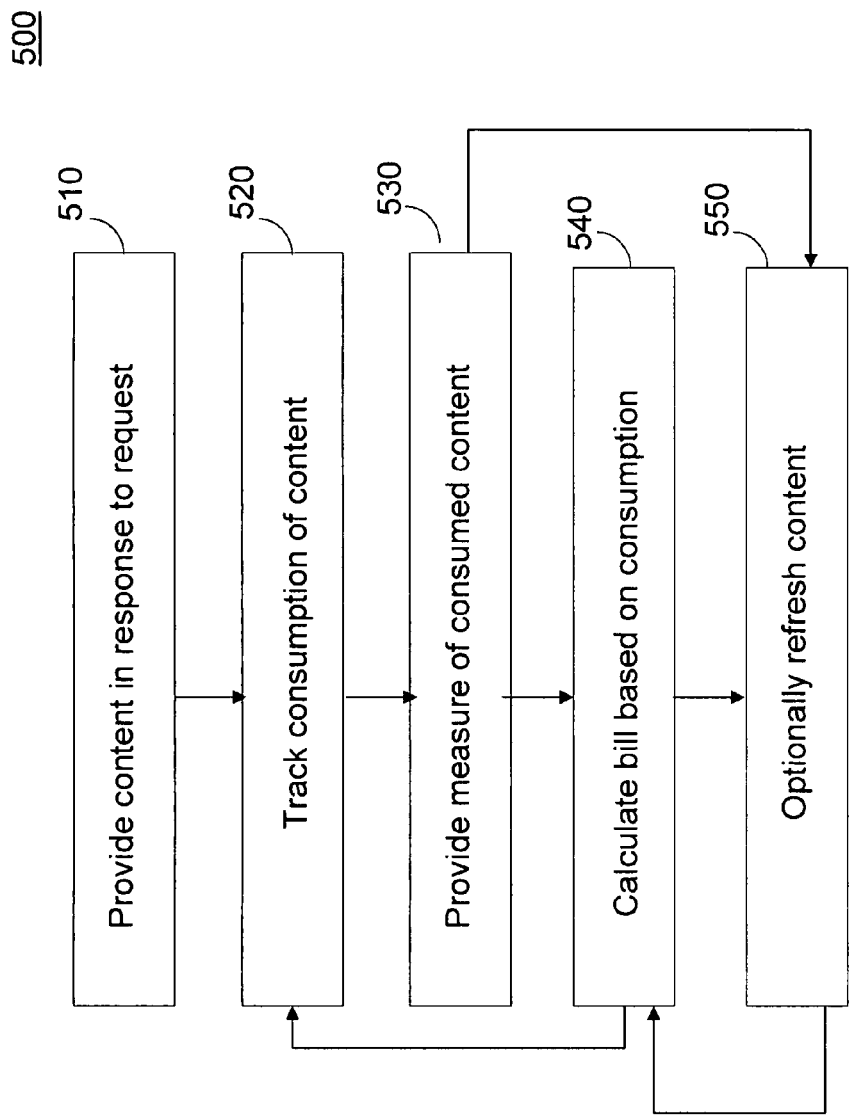
FIG. 5 is a flow chart illustrating some of the steps involved in the dynamic content pricing in accordance with an embodiment of the invention.

One embodiment may involve billing a user based on content actually consumed. A flow chart 500 illustrating some of the steps involved in billing a user based on consumed content is shown in FIG. 5. At the outset, a user may request or subscribe to certain content through the application program described above in connection with FIG. 1. The initial request may involve providing certain user specific information such as name, date of birth, social security number, address, phone number, etc. In other embodiments, less sensitive information such as an email address or name may be all that is required. In some embodiments, the user may be charged prior to the delivery of the first installment of content and billed based on consumption going forward. Or, in some embodiments, credit worthiness is assessed and the user charged later by the content provider or a billing agent. For example, in the case where a user is charged initially, and then billed to a credit account based on consumption afterwards, credit or debit card information may be provided (or another means of electronic payment such as PayPal). The user may be recursively charged on these accounts based on consumption going forward. Other billing methods may include the use of an electronic billing service such as Charge Me Later or Bill Me Later, which assess the user's credit worthiness based on information provided during the initial subscription period. Such services assume the obligation to pay the content provider and bill the user.

At step 510, content may be transmitted to the user as described in connection with the system of FIG. 1. The content provider may interface with the target device, such as computing device 115 or portable device 120 (either directly or through computing device 115) and install or initialize a counter that tracks the playback of the provided content (step 520). In some embodiments, where multiple content files are provided, a dedicated counter may be provided for each content file such that each dedicated counter tracks the playback of the content file it is assigned to. This may be accomplished by providing a counter program which generates other instances of itself as needed. In other embodiments, a single counter may monitor all files and mark starting and ending points at various time intervals and associate that data with each content file to track usage. Such counters may be provided by the content provider or may be resident in the playback device. In either case, the content provider may perform certain verification routines through verification or audit software to ensure the counter(s) are not altered or otherwise tampered with and are associated with the correct content files. In some embodiments, such programs supplied by the content provider may be "secure programs" which can be accessed only by the content provider or an agent of the content provider.

At step 530, when the user reconnects to the content source, the information from the counter programs may be supplied from the playback device to the content provider or other billing module via the feed URL. In some embodiments, this may involve providing billing information through a feed URL. This information may be used to calculate content consumption or may itself be the actual consumption information.

At step 540, the content provider may calculate and bill the consumer based on actual use reflected in step 530. This may involve a flat calculation based on the time of the playback or may vary depending on what content within the content provided was consumed (e.g., different portions of the provided content may be billed at different rates, etc.). At step 550, the consumed content may be updated with fresh content as described herein and the counter positions reinitialized and/or restarted to begin the counting process again (if necessary).

In some embodiments, at step 550, certain content may be refreshed even if it hasn't yet been consumed (e.g., if it exceeds a certain threshold). For example, a news program that is more than a certain numbers of days old may be automatically updated even if it hasn't been consumed. Such a "drop dead date" may be specified by the user. On the other hand, certain content which is not time sensitive, such as a chapter of an audio book, may remain until consumed or discarded as directed by the user. In some embodiments, the delivery of certain content, such as a subsequent episode or section, may be withheld until the previous episode is consumed (e.g., in cases where the subsequent episode or section depends on information in the previous one, etc.). In some embodiments, billing may be based on content which is refreshed. For example, after the consumed content is determined at step 530, the system may proceed directly to step 550 and refresh content based on consumption. In such embodiments, the content provided in the refresh step is used as a basis for determining the bill (step 540).

Embodiments of the present invention may also include serialized delivery for content of greater length, such as audio books. In these embodiments the enclosure URL may contain additional parameter(s) beyond other more standard parameters such as the length and file type parameters detailed in FIGS. 3 and 4. The additional parameter(s) may include a parameter that corresponds to the playback duration of content the user wishes to receive.

For example, the enclosure URL for the content feed may contain a duration parameter that indicates the duration of the content to be downloaded (e.g., a first hour, etc.). This parameter may be set by the content provider, specified by the user as a preference during an initial request session, or be based on the resources of the device receiving the download (such as memory). Subsequent enclosure URLs may then contain other duration parameters that indicate how much additional content should be downloaded during each session. In one embodiment, each subsequent download may be the proximate or adjacent segment of content, such as an episode, which may be of varying length, as specified by the user or service. Alternatively, it may indicate that each subsequent download makes available a segment of new content having a preset duration. Such an implementation protects the content provider from abusive downloading and replication and preserves system resources by limiting the total number of downloads to approximately that required to receive a complete version of the requested content.

In yet another embodiment, serialized content delivery based on consumption may be implemented through changes to the feed URL. In one embodiment, a consumption parameter may be encoded in the feed URL to indicate a position in the content up to which the content has been consumed. Thus at step 530, if the user has only consumed fifteen minutes of the one hour of content previously downloaded, the feed will only download an additional fifteen minutes to bring the total duration of unconsumed content back to one hour (at step 550). In these types of embodiments, the feed URL is updated and changed each time the application requests additional content. This allows the content provider to track and monitor the amount and duration of downloaded content, as well as delivering the content at a rate associated with the user's consumption. Tracking and noting this position allows the content provider to be aware of how much of the subscribed content has not been consumed. Marking the position for the user's next feed download allows the user to pick up where he or she last stopped the content, and allows for the protection of the content from abusive or replicated downloading. This new "position parameter" may be conveyed to the server or encoded into the feed URL. This may be used to adjust the address of the network location of the content so the immediately adjacent content may be subsequently downloaded (i.e., the network address may be adjusted accordingly and act as an index marker or bookmark into the content).

In an alternative embodiment, content providers may be able to provide content for a fee based on other pricing models. While certain embodiments may be based on the duration of content consumed, or listened to, other embodiments may be based on the duration of content delivered to the user (whether consumed or not).

In an embodiment in which pricing is based on the duration consumed, a user's consumption may be tracked. The balance due may be determined after the content has been consumed as described above. In streaming embodiments, consumption is measured based on the duration of content streamed from the server.

In embodiments where pricing is based on the duration of content delivered, the balance due may be determined upon delivery. The service may deliver sub-sets of the content as requested by the user (i.e., first hour or first chapter).

Under these pricing models, the user may have substantially free access to the complete library of the service. The user then may consume the content of the library on an "on-demand" basis and pay for the content as it is consumed.

In certain embodiments of the present invention, the system is able to differentiate between regular playback of content and mere navigation through the content by the user. For example, if a user fast forwards or skips through the sections of content, the counter would mark the skipped or fast forwarded sections and calculate the actual playback time exclusive of such navigation activity (e.g., at step 530).

Another aspect of the present invention provides systems and methods that allow users to share certain segments of content with others. Thus, for example, a person who received content may send a sample, such as an audio or video clip of that content, to another for their review. In one embodiment, the person receiving the sample would not be obligated to pay for the content, nor would the sender be in violation of copyright restrictions. Further transmission of such a segment would be allowed. Such segments may include advertising or other promotional materials associated with them. The advertising and promotional portion may be played prior to or immediately after the sample. Such samples may be sent on an untargeted basis, such as through email or other network transfer protocol, even though the original complete title was targeted to the sender and otherwise not shareable.

In other embodiments, however, depending on the size of the sample or copy restrictions in effect, the segment may be targeted, and thus require the receiver to register and/or pay before the segment can be consumed and may or may not include promotional or advertising material. Such embodiments may also limit or prohibit the number of retransmissions of the sample (through the use of copyright or other restriction software).

In certain embodiments of the invention, depending on the size of the file or the copy restrictions in effect, the entire file may be provided to another party and be restricted to a limited number of playbacks or be restricted to playback during a limited period of time. For example, if the work to be shared is a song or other relatively short audio or video piece, that work may be sent in its entirety to a limited number of third parties for their consumption. This may be desirable in cases where content licensing permits such sharing.

Figure 6:
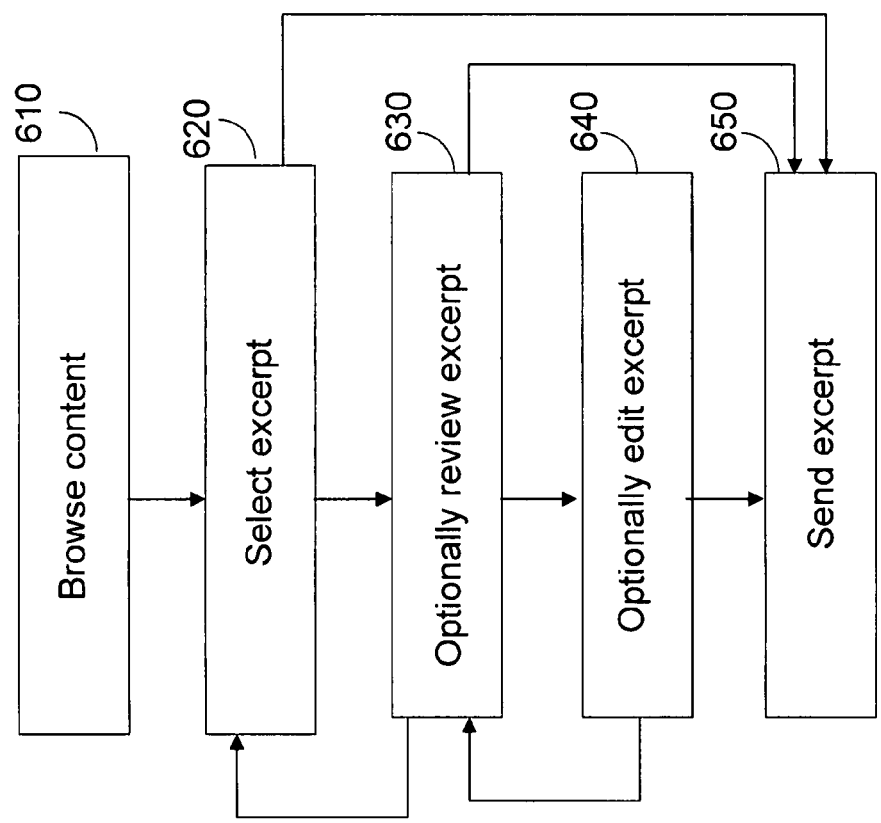
FIG. 6 is a flow chart illustrating some of the steps involved in selecting and providing content excerpts in accordance with an embodiment of the invention.

A flow chart 600 illustrating some of the steps involved in selecting and providing an excerpt or sample of content is shown in FIG. 6. At step 610, a user may browse or otherwise consume certain content on computing device 115 or mobile device 120. Based on this review, the user may notice certain sections of content he or she would like to share with others. The user may then select a sample of that content for sharing (step 620). This may involve the use of a sampling application program native on the playback device, or the sampling application may be supplied by the content provider or a third party software vendor. Other solutions include the use of certain other software such as Windows Media Player, Real Player or other player software that may support sampling or editing of content.

At step 620, selecting a desired excerpt of content with an appropriate application may involve digitally marking the section by inserting a start marker at the beginning of the desired excerpt and an end marker at the end of the excerpt (e.g., using a mouse to set the start and end markers on the playback bar that tracks the playback of the content). Once the desired section is identified, the user may select an "extract" or "excerpt" button which may copy that section of content to another file (and possibly to a pre-designated excerpt directory) that the user may name and prepare for sending to others.

In some embodiments, rather than requiring the use of start and end markers, the sampling application may allow the user to select a predefined sampling interval that a user can employ to select a section of content (e.g., 30 seconds, 1 minute, 5 minutes, etc.) With this approach, a user may select the desired predefined sample interval and superimpose that interval on a playback bar of a player with the content loaded (e.g., with a mouse). The superimposed portion defines the content to be copied for the sample. In other embodiments, the user may select a start point and the immediately following predefined section selected by the user (e.g., 30 second interval, etc.) defines the sample. Other methods are also possible, such as entering the start and end point (such as start and end time) into a sampling application from a counter that tracks the playback of content. If desired, at this point, the user may proceed directly to step 650 and send the excerpt.

Next, at step 630, however, the user may optionally review the selected excerpt or sample to ensure it is acceptable. If it is generally acceptable, the user may proceed directly to step 650 and send the excerpt or may proceed to step 640 and optionally edit the excerpt (discussed in more detail below). If the excerpt is not acceptable the user may return to step 620 to select another one as described herein. This process may be repeated until an acceptable excerpt is obtained.

In the case were an acceptable excerpt is obtained, the user may wish to further edit or modify the excerpt at step 640. This may be done to customize, personalize or further explain or introduce the content excerpt selected. For example, at step 640 the user may record an audio or video introduction (or trailer) inserted or appended to the excerpt which is played before (or after) the excerpt itself is played by the recipient. Such information may include the sender's audio or video comments, explanation, introduction, or other relevant or related materials (such as other content or a link to other content). It may also allow the user to add audio to a video excerpt or vice versa. The may be accomplished using a special editing application program or using known multimedia editing software.

After the excerpt has been edited the user may return to step 630 and review the resulting excerpt (or just the changed sections) to ensure it is acceptable. The user may repeat steps 630 and 640 until an acceptable sample has been obtained.

Next, at step 650, the user may send the excerpt to one or more intended recipients. This may involve selecting one or more excerpts from a directory of excerpts and attaching them to a text message or email message for distribution to others. Upon sending the excerpt, the server may attach or insert certain promotional or advertisement sections to the excerpt. Moreover, the excerpt may be scanned to determine if the length of the excerpt is beyond that permitted by the content provider or if the excerpt is eligible for retransmission. This may occur at devices 115 and/or 120 or may occur at a transmission gateway such as an email or text message gateway. Several additional optional steps may also occur. If the excerpt is in violation of these other criteria, transmission may be prohibited (by a transmission server or at the device level).

Moreover, it will be understood in some embodiments of the invention that content may be supplied with certain pre-made excerpts or samples by the content provider. In this case, these excerpts may be browsed, selected and reviewed at steps 610, 620 and 630 and sent at step 650. In some embodiments, the content provider may attach advertisements to these excerpts. Some pre-made excerpts may also be edited and reviewed as described herein at steps 630 and 640.

In some embodiments, the sender sends the receiver a link at step 650, the link connects to the server storing the excerpt, and the server then delivers the segment to the receiver. In other embodiments, the segment is sent directly from sender to receiver. Certain embodiments of the present invention include mechanisms that prevent the user from sending numerous segments, such that substantially all of the title has been sent to the receiver.

The excerpt sharing feature described herein may be used to enhance customer reviews of services and content provided. For instance, a user may provide a review in the form of commentary on the narrator's performance or ability, and provide a segment where the narrator was particularly engaging. Moreover, excerpts sent to others may include a link to a chat room or website where the recipient may read or post reviews on the content.

An embodiment of the present invention may also be designed to function with passive devices, i.e. those that are not able to initiate the sending or receiving of the segment. In such embodiments, a sharing feature may be defined specifically for passive devices. A passive device may enable the user to mark segments of the content. The communication between the passive device 120 and computing device 115 may then include retrieving the segments of content that had been marked since the previous connection.

Figure 7A:
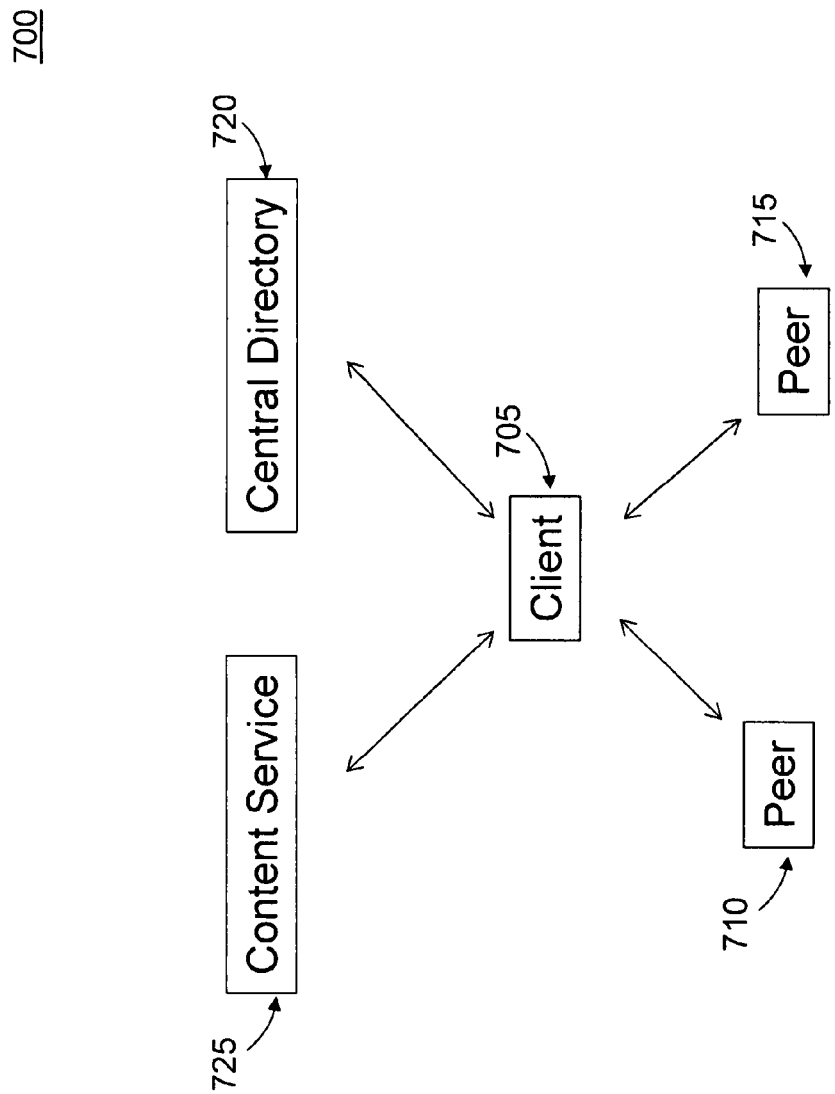
FIG. 7a is an illustrative diagram of a peer to peer computer network in accordance with an embodiment of the present invention.

Another aspect of the present invention employs the use of peer to peer or BitTorrent protocols to provide customized content files to a user. For example, FIG. 7a generally illustrates a basic peer to peer network 700 in accordance with the present invention, and FIG. 7b generally illustrates a basic BitTorrent network 750 in accordance with the present invention. As shown in FIG. 7a, client 705, which may be computing device 115 or portable device 120, may communicate with peer computing devices 710 and 715, a content service 725 and a central directory 720, each of which may be a remote, network connected computer.

In operation, client 705 may request a customized content file, such as those described herein, which may be defined as a collection of discrete logical components such as sections, chapters, advertisements, promotional material, etc. When client 705 requests a customized content file from content service 725, content service 725 returns a specification for the customized content file (e.g., a list of logical components that define that customized content file). For example, such a specification may be provided as a result of a customized enclosure request. For each logical component in the specification, client 705 may contact central directory 720 to determine which peer computing device has the requested component. In other embodiments, the entire content file specification may be provided to central directory 720, which may provide a list of peers which have the requested information.

Based on the information provided by central directory 720, client 705 chooses peers which have the components and requests delivery. Peer computers 710 and 715 may provide some (or all) components, yet other components may need to be provided by content service 725. Once client 705 has received all (or a sufficient number of) components, it assembles the final customized content file. Client 705 may also register with central directory 720 to inform it of the logical components it has, so that client 705 may now provide these components to other peers. Thus, with this approach, the components of the requested customized content file may be obtained from peers rather than receiving the complete file from content service 725. This allows such files to be received faster and using fewer resources than if the complete customized file were transmitted from a single location.

Figure 7B:
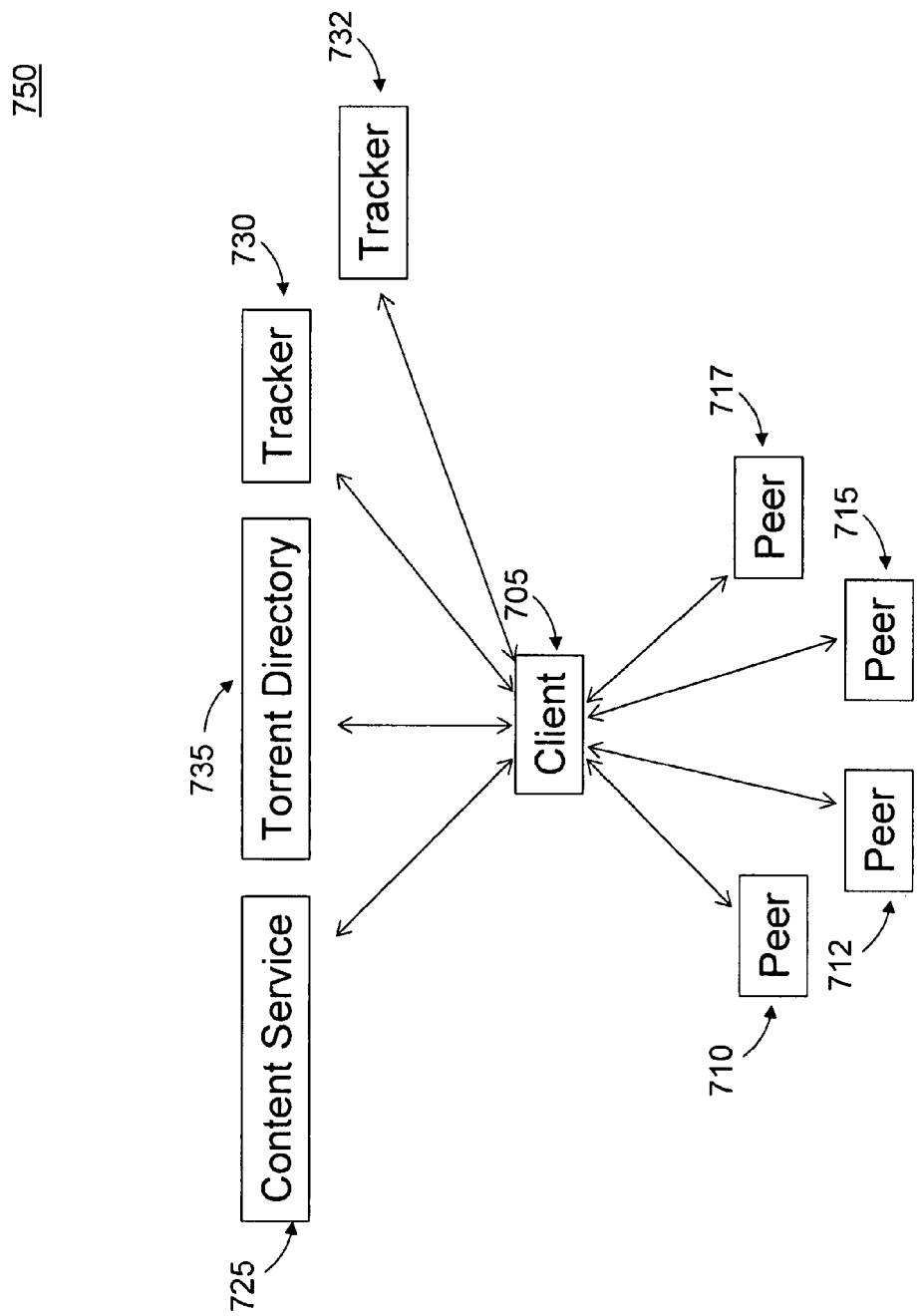
FIG. 7b is an illustrative diagram of a BitTorrent peer to peer computer network in accordance with an embodiment of the present invention.

Turning now to FIG. 7b, a BitTorrent embodiment of the present invention is shown. In operation, client 705 may request a customized content file, such as those described herein, which may be defined as a collection of discrete logical components such as sections, chapters, advertisements, promotional material, etc. When client 705 requests a customized content file from content service 725, content service 725 returns a specification for the customized content file (e.g., a list of logical components that define that customized content file). For example, such a list may be provided as a result of customized enclosure request.

At this point, client 705 may request a torrent from torrent directory 735 that represents a logical component of the customized content file. The torrent may be a small file that contains metadata about the requested component and includes information about trackers 730 or 732, which coordinate component distribution. Each logical component may be constructed from multiple smaller pieces which may be fixed in size. Client 705 may download the torrent and connect to a specified tracker to determine which peers 710, 712, 715 and 717 have the pieces which cumulatively form the requested logical component. Trackers 730 and 732 may be contacted substantially serially (one after the other), or in parallel (substantially concurrently). Next, client 705 may contact the identified peers to obtain the pieces necessary to construct the requested logical component. Once client 705 has received all (or a sufficient number of) pieces, it assembles the logical component. This process may be repeated for each logical component in the customized content file.

In some embodiments, client 705 may request a list of torrents from torrent directory 735 that represent the customized content file. Such a list of torrents may be referred to as a metatorrent. Client 705 may download the metatorrent and connect to one or more specified trackers, to determine which peers have the pieces that cumulatively form the requested logical components in customized content file. Next, client 705 may contact the identified peers to obtain the pieces necessary to construct the customized content file. Once client 705 has received all (or a sufficient number of) pieces, it assembles the final customized content file.

Client 705 may also register with the trackers to inform them which logical components it has, so that it may now offer to serve pieces of these components to other peers. Thus, with this approach, the components of the requested customized content files as described herein may be obtained from peers rather than receiving the customized content file from content service 725.

Figure 8:
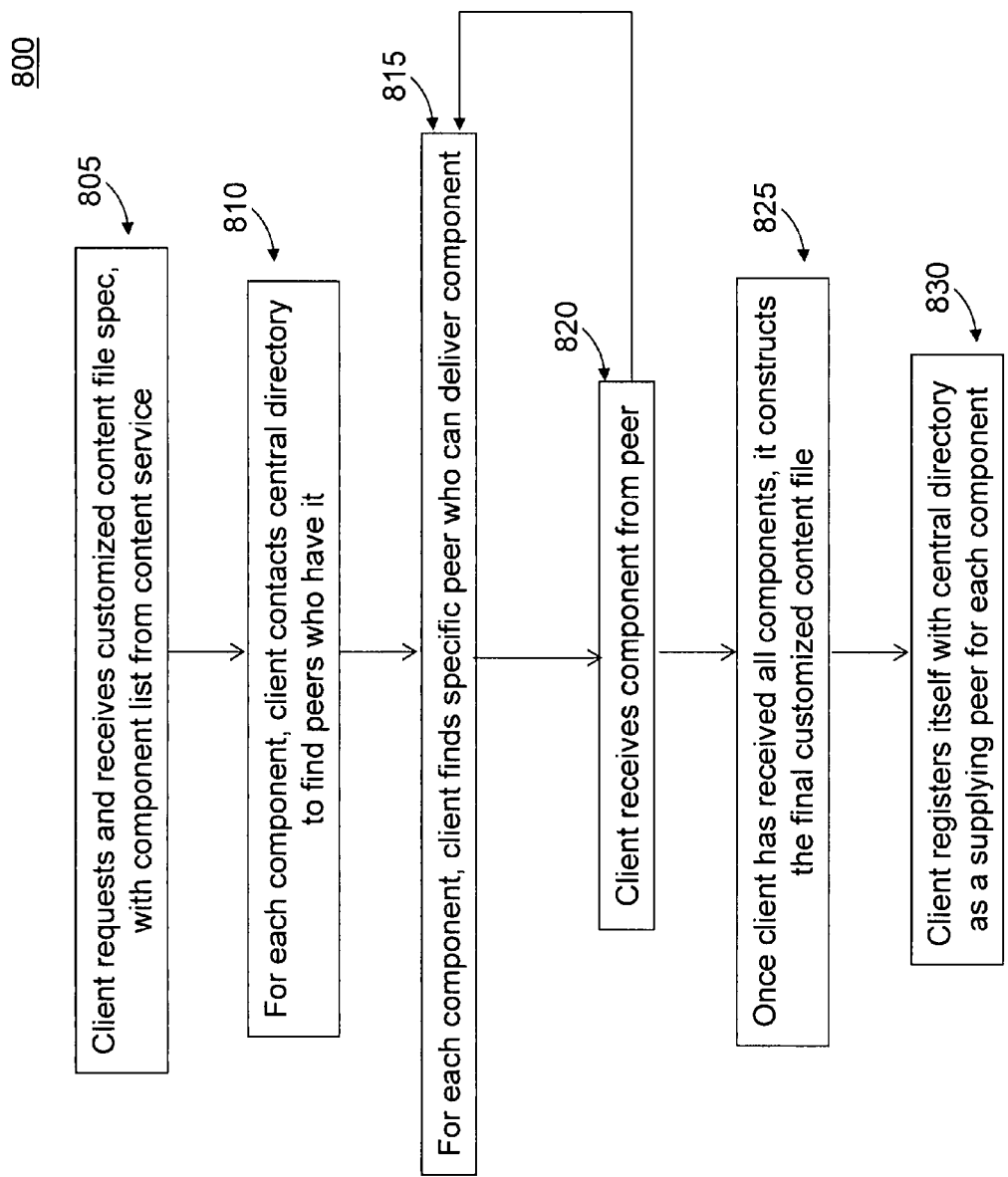
FIG. 8 is a flow chart illustrating some of the steps involved in providing customized content files in a peer to peer environment in accordance with an embodiment of the invention.

A flow chart 800 illustrating some of the steps involved in providing customized content in a peer to peer environment is shown in FIG. 8. At step 805, client 705 may request and receive a customized content file specification from a content source 725, expressed as a list of logical components which may be constructed as described herein. Next, at step 810, for each logical component in the list, client 705 contacts central directory 720 to determine which peers have the logical component.

At step 815, client 705 finds the specific peer that can deliver the component. Next, at step 820, client 705 receives the component from the selected peers. The client 705 may repeat steps 815 and 820 until it receives all or substantially all components. At step 825, the received components may be assembled to create the requested customized content file. The client 705 may then register with central directory 720 as a supplying peer for each of the received components (step 830).

Figure 9:
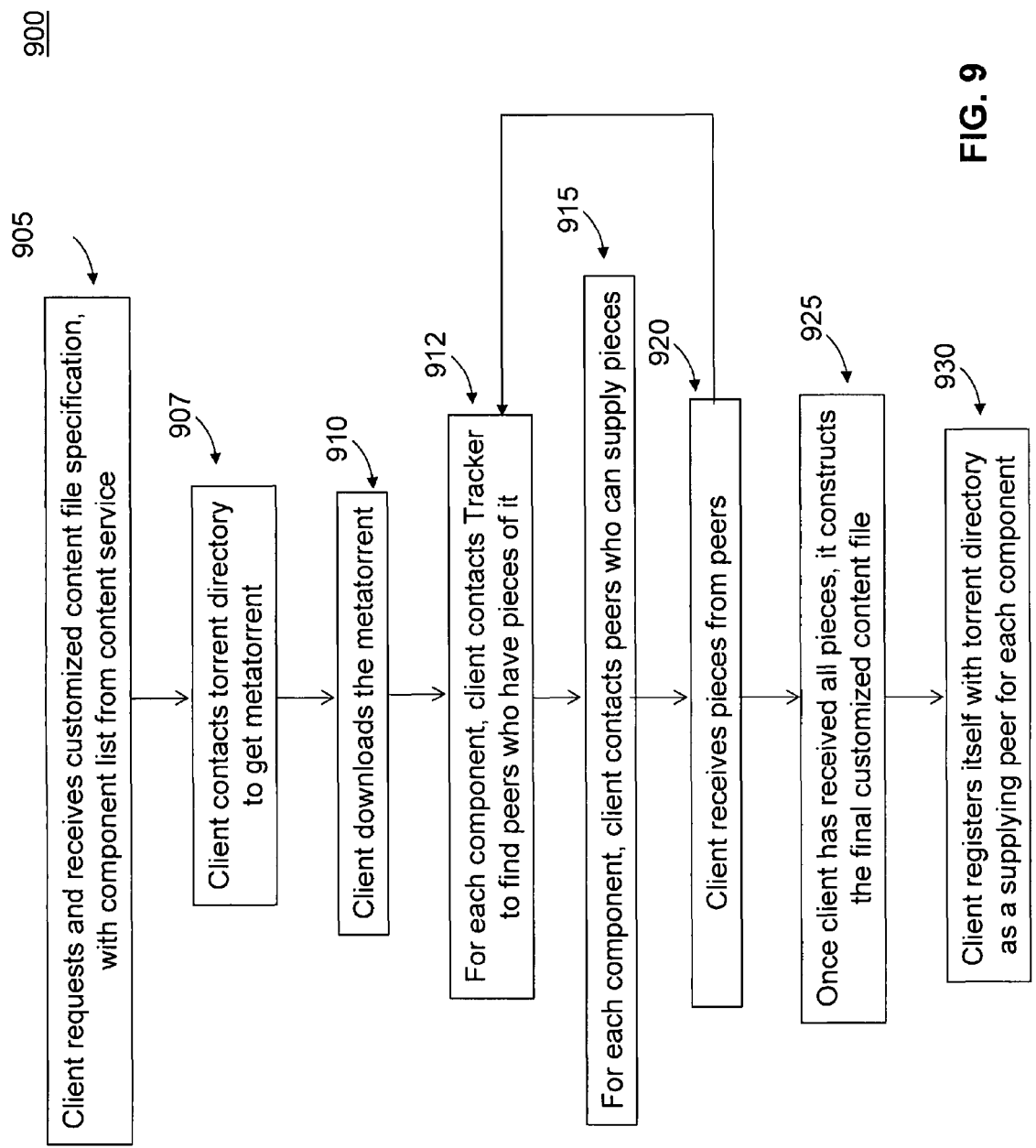
FIG. 9 is a flow chart illustrating some of the steps involved in providing customized content files in a BitTorrent peer to peer environment in accordance with an embodiment of the invention.

A flow chart 900 illustrating some of the steps involved in providing customized content in a metatorrent embodiment is shown in FIG. 9. At step 905, client 705 may request and receive a customized content file specification from content service 725, expressed as a list of logical components which may be constructed as described herein. Next, at step 907, client 705 contacts torrent directory 735 to receive a metatorrent which includes torrent files that specify the trackers. Client 705 then downloads the metatorrent at step 910.

At step 912, client 705 contacts the tracker(s) specified by the torrents contained in the metatorrent to determine which peers have the pieces required to assemble the logical component. At step 915 client 705 contacts the peers which are able to supply pieces of the desired component. Next, at step 920, client 705 receives the pieces from the selected peers. At step 925, the received pieces may be assembled to create the requested customized content file directly or may be used to assemble logical components which are then combined to create the customized content file. And at step 930, client 705 may register with torrent directory 735 as a supplying peer for each of the received components.

While the invention has been described and illustrated in connection with preferred embodiments, many variations and modifications will be evident to those skilled in the art and may be made without departing from the spirit and scope of the invention. For example, although content is described herein as being communicated from a server, such content could also be transferred to computing device 115 and/or portable device 120 from a chip or other local memory device. This may include obtaining a physical chip and connecting through a USB or other communications port for a download. Billing, customization, excerpts, or other features may be performed on this basis with the playback device connecting to a network or Internet to perform some or all of the features described herein.

The invention is thus not to be limited to the precise details of methodology or construction set forth above as such variations and modification are intended to be included within the scope of the invention.

What is claimed is:

1. A computer-implemented method for billing a content consumer based on content consumption, the method comprising:
    as implemented by one or more computing devices configured with specific executable instructions,
        providing electronic content to a playback device of a consumer;
        receiving an indication of an amount of the content actually consumed by the consumer, wherein the amount is determined at least in part by:
            identifying portions of the content traversed during content navigation activity, wherein the content navigation activity is associated with a fast-forward operation or a skip operation; and
            tracking the content consumed, excluding the identified portions of the content traversed during content navigation activity, such that any content traversed in association with a fast-forward operation or a skip operation is excluded from the amount of the content actually consumed; and
        calculating a cost of content based on the indication of the amount of content consumed exclusive of the content traversed during content navigation activity.

2. The computer-implemented method of claim 1, further comprising providing a content counter to a playback device of the consumer.

3. The computer-implemented method of claim 2, wherein the playback device uses the content counter to provide the indication of the content consumed.

4. The computer-implemented method of claim 1, wherein tracking the content actually consumed by the content consumer includes obtaining a position parameter.

5. The computer-implemented method of claim 1, wherein the content navigation activity is associated with a fast-forward operation, such that content traversed in association with the fast-forward operation is excluded from the amount of the content actually consumed.

6. The computer-implemented method of claim 1, further comprising adjusting a network location of content based, at least in part, on a position parameter.

7. The computer-implemented method of claim 1, wherein the indication of the amount of content actually consumed is received from a proxy computing device.

8. A system for billing a content consumer based on content consumption, the system comprising:
    a data store configured to store electronic content; and
    one or more configured computer systems in communication with the data store that are configured to:
        provide electronic content to a playback device of a consumer;
        identify one or more portions of the electronic content traversed during content navigation activity, wherein the content navigation activity is associated with a fast-forward operation or a skip operation;
        track an amount of content actually consumed by the consumer based on an indication of consumed content received from the playback device and excluding the identified one or more portions of the electronic content traversed during content navigation activity, such that any content traversed in association with a fast-forward operation or a skip operation is excluded from the amount of content actually consumed; and
        calculate a cost of content based on the amount of content actually consumed.

9. The system of claim 8, further comprising providing a content counter to the playback device of the consumer.

10. The system of claim 9, wherein the content counter provides the indication of the consumed content.

11. The system of claim 8, wherein tracking the amount of content actually consumed comprises obtaining a position parameter from the playback device.

12. The system of claim 8, wherein the content navigation activity is associated with a skip operation.

13. The system of claim 8, further comprising adjusting a network location of content based, at least in part, on a position parameter received from the playback device.

14. A computer-readable, non-transitory storage medium having at least one computer-executable component, the at least one computer-executable component comprising:
    a module configured to:
        provide electronic content to a playback device of a consumer;
        receive an indication of an amount of the content actually consumed by the consumer, wherein the amount is determined at least in part by:
            identifying one or more portions of the content traversed during content navigation activity, wherein the content navigation activity is associated with a fast-forward operation or a skip operation; and
            tracking the content consumed, excluding the identified one or more portions of the content traversed during content navigation activity, such that any content traversed in association with a fast-forward operation or a skip operation is excluded from the amount of the content actually consumed; and
        calculate a cost of content based on the indication of the amount of content consumed.

15. The computer-readable, non-transitory storage medium of claim 14, wherein tracking the amount of content actually consumed comprises obtaining a position parameter.

16. The computer-readable, non-transitory storage medium of claim 14, wherein the indication of the amount of content actually consumed is received from a proxy computing device.

17. The computer-readable, non-transitory storage medium of claim 14, wherein the content navigation activity is associated with a fast forward operation.

* * * * *